United States Patent [19]

Edwards, Jr. et al.

[11] 4,302,679
[45] Nov. 24, 1981

[54] METHOD OF DETERMINING THE X-RAY LIMIT OF AN ION GAUGE

[75] Inventors: David Edwards, Jr., Bellport; Christopher P. Lanni, Shirley, both of N.Y.

[73] Assignee: The United States of America as represented by the United States Department of Energy, Washington, D.C.

[21] Appl. No.: 64,594

[22] Filed: Aug. 7, 1979

[51] Int. Cl.³ .................... B01D 59/44; H01J 49/26
[52] U.S. Cl. ............................ 250/489; 313/7
[58] Field of Search .............. 250/489, 283, 397; 313/7; 315/111.9; 324/460, 459

[56] References Cited

U.S. PATENT DOCUMENTS 2,829,337  4/1958  Groendijk ........................ 313/7
3,267,326  8/1966  Hayward et al. ................. 313/7

*Primary Examiner*—Bruce C. Anderson
*Attorney, Agent, or Firm*—Leonard Belkin; Dean E. Carlson; James E. Denny

[57] ABSTRACT

An ion gauge having a reduced "x-ray limit" and means for measuring that limit. The gauge comprises an ion gauge of the Bayard-Alpert type having a short collector and having means for varying the grid-collector voltage.

The "x-ray limit" (i.e. the collector current resulting from x-rays striking the collector) may then be determined by the formula:

$$I_x = \frac{\alpha I_l - I_h}{\alpha - 1}$$

where:

$I_x$ = "x-ray limit", $I_l$ and $I_h$ = the collector current at the lower and higher grid voltage respectively; and, $\alpha$ = the ratio of the collector current due to positive ions at the higher voltage to that at the lower voltage.

3 Claims, 2 Drawing Figures

METHOD OF DETERMINING THE X-RAY LIMIT OF AN ION GAUGE

BACKGROUND OF THE INVENTION

The invention described herein was made or conceived in the course of, or under a contract with, the United States Department of Energy.

A typical or commercial ionization gauge of the Bayard-Alpert type is shown schematically in FIG. 1. Such ionization gauges are an inexpensive and effective way for measuring very high vacuum. Such a gauge comprises a filament 10, a grid 20 formed of wire or mesh which encloses and defines a known volume and which is at a relatively high potential, typically on the order of hundreds of volts, and a collector 30, formed of a thin wire extending through or substantially through the space enclosed by grid 20, and which is at a relatively low potential, typically ground. Collector shield 50, which is at collector potential, is electrically isolated from collector 30 and shields the lower end of collector 30 and its mounting structure (not shown).

In operation filament 10 is heated by passing a current through it and emits electrons which are accelerated towards grid 20. Some accelerated electrons pass through grid 20 and strike residual gas atoms in the volume defined by grid 20. These electrons possess sufficient energy to ionize the residual gas atoms. The positive ions so formed are attracted towards and collected on the collector 30. This positive ion current is a measure of the number of residual atoms in the known volume (i.e., a measure of the pressure).

The electrons passing through grid 20, as well as those electrons formed by ionization are ultimately attracted to and collected on grid 20. Frequently these electrons strike grid 20 with a sufficient energy to cause the emission of soft x rays. If these x rays should strike collector 30, they may cause the photoemission of electrons. Obviously, such a photoemitted electron is the electrical equivalent of a collected positive ion. This spurious current is generally referred to as the "x-ray limit."

It is desirable to both reduce and measure the "x-ray limit" in pressure gauges. Reduction of the "x-ray limit" is achieved by the simple expedient of reducing the length and diameter of the collector wire, thereby reducing the chance that the collector will be struck by an x ray. The design and operation of an ion gauge having a short collector wire is described more fully in report *Bayard-Alpert Gauge with Reduced X-ray Limit* by Schuetze and Stork, Trans. of the 9th Vacuum Symposium, MacMillan Co. '62, which report is hereby incorporated by reference.

Measurement of the "x-ray limit" is achieved in the prior art by the addition of a modulator wire 40 to the gauge of FIG. 1. Modulator wire 40 may be varied between two voltages, typically between the collector voltage and the grid voltage. When the modulator wire 40 is at the grid voltage, all the positive ion current will flow through collector 30. When modulator 40 is at the collector voltage, a portion of the positive ion current will flow in modulator 40. Since the photoelectric current in collector 30 (i.e. "the x-ray limit") remains constant, these two measurements may be used to determine the "x-ray limit" by means well known to those skilled in the art of vacuum measurement. Measurement of the "x-ray limit" has been achieved in the prior art by means of modulator wires for both short and long collector gauges which add to the complexity and cost of the ion gauge.

SUMMARY OF THE INVENTION

Thus it is an object of the subject invention to measure the "X ray limit" in an ion gauge having a reduced and measurable "x-ray limit" and a simple construction.

Other objects and advantages of the subject invention will become apparent from the description given below.

The objects of the present invention are achieved and the disadvantages of the prior art are overcome using an ion gauge having a filament, grid and a short collector, that is, a Bayard-Alpert type ion gauge having a short collector, the gauge also including means for providing two differing constant potentials between the grid and collector. The x-ray pressure may then be determined by the formula:

$$I_X = \frac{\alpha I_l - I_h}{(\alpha - 1)}$$

where $I_x$ is the current due to photoemission of electrons from the collector. $I_l$ is the total collector current at the lower voltage and $I_h$ is the total collector current at the higher voltage and $\alpha$ is the ratio of the collector current due to positive ions at the higher voltage to the collector current due to positive ions measured at the lower voltage. The constant $\alpha$ may be determined by the formula:

$$\alpha = \frac{I_h' - I_h''}{I_l' - I_l''}$$

where $I'_h$ and $I'_l$ are the collector currents at the higher and lower voltages respectively at a first pressure and $I''_h$ and $I''_l$ are the collector currents at the higher and lower voltages respectively at a second pressure.

In both the prior art and the subject invention, the "x-ray limit" is measured by varying the electric field within the volume defined by the grid so as to vary the positive ion current at the collector. Since x rays are not affected by changes in the electric field, the "x-ray limit" would remain constant as the field was changed. Thus, by varying the electric field within the volume defined by the grid, it is possible to determine the "x-ray limit." In the prior art a modulator wire was added to the structure of the ion gauge to provide means to vary the electric field. Such modulator wires were believed necessary since, in a typical ion gauge having a long collector wire, essentially all the positive ions would be trapped by the collector even though the collector to grid voltage was substantially reduced. The present invention is based on the unobvious realization that the strong dependence of the positive ion current on the collector to grid voltage in ion gauges having a short collector wire may be used to obtain the necessary variation in positive ion current.

Thus, the present invention provides a simple and inexpensive ion gauge having a low "x-ray limit" and means whereby that "x-ray limit" may be measured.

DETAILED DESCRIPTION OF THE INVENTION

Figure 1:
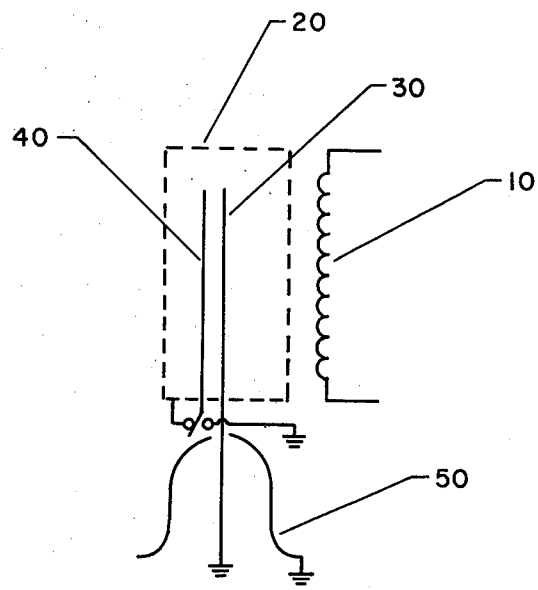
FIG. 1 is the schematic illustration of a prior art ion gauge having a modulator wire.
Figure 2:
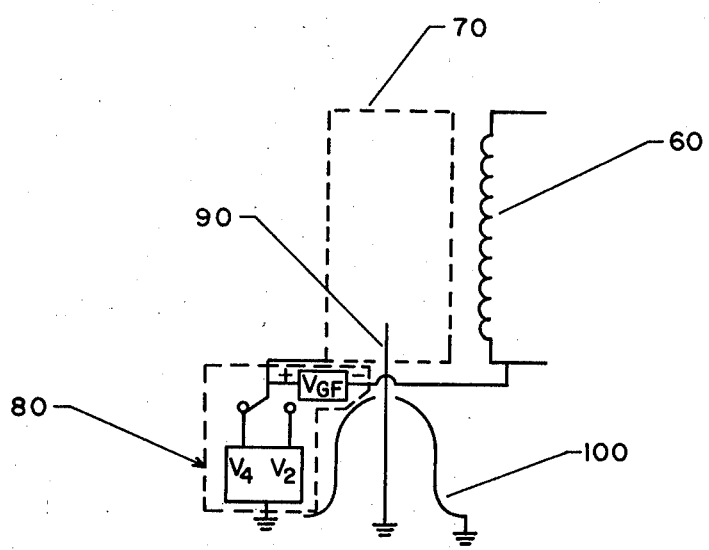
FIG. 2 is a schematic illustration of an ion gauge whose x-ray limit may be measured in accordance with the method of the subject invention.

Referring now to FIG. 2, a filament 60 is provided for the emission of electrons. Filament 60 is heated by a current source (not shown) and in a preferred embodiment is maintained at a potential of approximately 150 volts below grid 70. In a preferred embodiment, filament 60 emits a current of approximately 4 milliamperes.

Filament 60 is mounted about 0.6 centimeters from grid 70 which surrounds and defines a cylindrical volume approximately 2 centimeters in diameter and 6 centimeters in length. Grid 70 and filament 60 are connected to variable power supply 80. In the preferred embodiment grid 70 may be switched from a first potential, $V_4$ of from 400 to 450 volts, to a second potential $V_2$ of approximately 200 volts while maintaining a potential $V_{GF}$ of about 150 volts from grid 70 to filament 60. Collector 90, which comprises a wire approximately 125 microns in diameter projects into the volume defined by grid 70 approximately one centimeter, approximately along the axis of the cylinder defined by grid 70. Collector 90 is preferably maintained at ground potential. The lower end of collector 90 and its mounting structure (not shown) are shielded from x rays by collector shield 100. Details, such as mechanical structure, power supplies, meters, etc., which are not shown, or discussed, are not necessary for understanding the subject invention and would be obvious to a person skilled in the art of vacuum gauges.

In operation, electrons emitted by filament 60 are accelerated towards grid 70, which is at a voltage of approximately 400 to 450 volts above ground, and acquire an energy of approximately 150 eV. Electrons passing through grid 70 may strike residual gas atoms within the volume defined by grid 70 and ionize these atoms. The positive ions formed in these collisions are attracted to and collected by collector wire 90 while the free electrons within the volume formed by grid 70 are attracted to and ultimately collected by grid 70. Because the collector to grid voltage is substantially higher than is normal for an ion gauge of the Bayard-Alpert type, the positive ions are collected by collector 90 with essentially equal efficiency to that of the long collector ion gauges of the prior art.

Free electrons within the volume defined by grid 70 are attracted to and finally collected by grid 70, and soft x-ray photons may be produced. However, since collector 90 is physically small, fewer of these photons are intercepted by collector 90, resulting in a lower "x-ray pressure."

Since the emission of x-ray photons by grid 70 and the emission of photoelectrons by collector 90 are surface effects which may vary in time, the "x-ray limit" should be measured relatively frequently. Since the efficiency which positive ions are collected on collector 90 is strongly dependent on the collector to grid potential for the ion gauge of the subject invention; while, at least to a first order of Approximation, the "x-ray limit" is not, the "x-ray limit" may be determined by measuring the collector current I at the two grid potentials and computing $I_x$, the current due to photoemission of the electrons from collector 90 by the following formula:

$$I_x = \frac{\alpha I_2 - I_4}{\alpha - 1}$$

where $I_2$ is the collector current when grid 70 is at a potential of approximately 200 volts and $I_4$ is the collector current when grid 70 is at a potential of from 400 to 450 volts, and $\alpha$ is the ratio of the collector current due to positive ions when the grid is at a voltage of approximately 400 to 450 volts to the collector current due to positive ions when grid 70 is at a potential of approximately 200 volts.

Since the ratio $\alpha$ is substantially independent of the pressure, it may be determined by measuring the collector current at the two different potentials at two different pressures. $\alpha$ is then determined by the formula:

$$\alpha = \frac{I_4' - I_4''}{I_2' - I_2''}$$

where $I'_4$ and $I''_4$ are the collector currents at voltages of 400 to 450 volts at two different pressures, and similarly $I'_2$ and $I''_2$ are the collector currents at the two different pressures with a grid voltage of approximately 200 volts. Since $\alpha$ is primarily determined by the geometry of the ion gauge, it is not necessary to make frequent determination of $\alpha$. Preferably $\alpha$ need only be determined after the vacuum gauge is exposed to ambient conditions and requires a bake out. Those, however, requiring more certainty in their measurements might choose to determine $\alpha$ more frequently.

The above description is given by way of illustration only, and variations on the subject invention will be obvious to those skilled in the art of vacuum measurement. Limitations on the subject invention are set forth only in the claims below.

What is claimed is:

1. A method for determining the "x-ray limit", $I_x$, in an ion gauge of the Bayard-Alpert type having a short collector where the portion of ions collected is substantially dependent on the grid to collector potential, comprising the steps of:
    (a) measuring the collector current, $I_h$, at a first, higher potential;
    (b) measuring the collector current, $I_l$, at a second, lower, potential; and
    (c) determining $I_x$ by the formula:

$$I_x = \frac{\alpha I_l - I_h}{(\alpha - 1)}$$

where $\alpha$ is the ratio of the collector current due to positive ions at said first potential to the collector current due to positive ions at said second potential.

2. A method as described in claim 1 wherein $\alpha$ is determined by the steps of:
    (a) measuring the collector current, $I'_h$, at a first pressure at the greater of said two voltages;
    (b) measuring the collector current, $I''_h$, at a second pressure at the greater of said two voltages;
    (c) measuring the collector current, $I'_l$, at said first pressure at the lesser of said two voltages;
    (d) measuring the collector current, $I''_l$, at said second pressure at the lesser of said two voltages; and,
    (e) determining $\alpha$ by the formula:

$$\alpha = \frac{I_h' - I_h''}{I_l' - I_l''}$$

3. The method of claim 2 wherein said collector means is maintained at a ground potential and the greater of two said voltages is from 400 to 450 volts, and the lesser of said two voltages is approximately 200 volts.

* * * * *